United States Patent
Hoshino

(10) Patent No.: US 12,172,494 B2
(45) Date of Patent: Dec. 24, 2024

(54) VEHICLE AIR CONDITIONER CONTROL SYSTEM AND NON-TRANSITORY RECORDING MEDIUM STORING VEHICLE AIR CONDITIONER CONTROL PROGRAM

(71) Applicant: TOYOTA JIDOSHA KABUSHIKI KAISHA, Toyota Aichi-ken (JP)

(72) Inventor: Yu Hoshino, Toyota Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 17/981,612

(22) Filed: Nov. 7, 2022

(65) Prior Publication Data

US 2023/0148249 A1    May 11, 2023

(30) Foreign Application Priority Data

Nov. 9, 2021   (JP) .................... 2021-182422

(51) Int. Cl.
  *B60H 1/32*   (2006.01)
  *B60W 60/00*   (2020.01)
  *B60W 10/30*   (2006.01)

(52) U.S. Cl.
  CPC ....... *B60H 1/3208* (2013.01); *B60W 60/0053* (2020.02); *B60W 10/30* (2013.01); *B60W 2710/305* (2013.01)

(58) Field of Classification Search
  CPC ............ B60H 1/00021; B60H 1/00278; B60H 1/00764; B60H 1/00785; B60H 1/32; B60H 1/3208; B60H 3/0035; B60H 2001/00114; B60H 2001/003; B60W 10/30; B60W 2710/305; B60W 30/143; B60W 40/02; B60W 60/0053; G05D 1/0061; G05D 1/021; B62D 15/025
  USPC .......................................... 701/23
  See application file for complete search history.

(56) References Cited

U.S. PATENT DOCUMENTS

| 8,622,862 B2 * | 1/2014 | Koyama | ............... B60K 6/365 74/330 |
| 2019/0366844 A1* | 12/2019 | Yoon | ..................... B60W 50/14 |
| 2020/0218258 A1* | 7/2020 | Subramanian | ........ B60W 10/08 |

FOREIGN PATENT DOCUMENTS

| JP | H08-244448 A | 9/1996 |
| JP | 2017-210019 A | 11/2017 |
| JP | 2019-214219 A | 12/2019 |

* cited by examiner

Primary Examiner — Andrew Joseph Rudy
(74) Attorney, Agent, or Firm — Dinsmore & Shohl LLP

(57) ABSTRACT

In a driving switching preparing section of a road wherein autonomous driving performed by an autonomous driving ECU or autonomous driving controller is switched to manual driving performed by a driver, an air conditioner ECU or an air conditioner controller is configured to prohibit air conditioner power cutting control.

6 Claims, 14 Drawing Sheets

VEHICLE AIR CONDITIONER CONTROL SYSTEM AND NON-TRANSITORY RECORDING MEDIUM STORING VEHICLE AIR CONDITIONER CONTROL PROGRAM

CROSS REFERENCE TO RELATED APPLICATION

This application claims priority to Japanese Patent Application No. 2021-182422, filed on Nov. 9, 2021, which is incorporated herein by reference in its entirety including the specification, claims, drawings, and abstract.

TECHNICAL FIELD

The specification discloses a vehicle air conditioner control system installed on a vehicle capable of autonomous driving, and a non-transitory recording medium storing a vehicle air conditioner control program to be executed by the system.

BACKGROUND

JP 2017-210019 A, for example, discloses an air conditioner control process performed during autonomous driving of a vehicle. The control process controls an air conditioner to place a higher priority on occupants' comfort than on occupants' visibility during autonomous driving as compared to when autonomous driving is not performed. For example, during autonomous driving, keeping moisture within the vehicle cabin takes precedence over defogging of the windshield (windshield glass).

In response to the vehicle passing a point located a predetermined distance before a transition point from the autonomous driving mode to the manual driving mode, whether windshield fogging occurs is detected. Then, in response to detection of windshield fogging, a defroster is actuated. Actuation of the defroster at a point before the transition point enables an increase in the visibility of a vehicle occupant (especially a driver) to outside the vehicle before transition to the manual driving mode.

JP H8-244448 A, for example, further discloses a vehicle air conditioner controller. The air conditioner includes a compressor that compresses a refrigerant and is driven with electric power from an internal combustion engine or an on-vehicle battery. In the former case, the output of the internal combustion engine is partially assigned to driving of the compressor, with the remaining output being assigned to driving power of the vehicle. In the latter case, as the electric power from the on-vehicle battery is supplied to the rotary electric machine in a vehicle including the rotary electric machine serving as a drive source, the power of the on-vehicle battery is allocated to the compressor and the rotary electric machine.

In response to a large driving power required for a vehicle, such as at the time of sudden acceleration or going uphill, air conditioner power cutting control is performed for temporarily reducing, or typically stopping, the output of the compressor to thereby secure the driving performance of the vehicle. Based on an autonomous mode selected for operation setting of the air conditioner, for example, the air conditioner controller performs the air conditioner power cutting control in accordance with the driving power required for the vehicle.

The present specification discloses a vehicle air conditioner control system that enables securing of a windshield glass defogging function at the time of switching from autonomous driving to manual driving, and a non-transitory recording medium storing a vehicle air conditioner control program.

SUMMARY

A vehicle air conditioner control system disclosed in the specification includes an air conditioner, an air conditioner controller, and an autonomous driving controller. The air conditioner includes a compressor. The compressor is configured to contend with a driving wheel for torque of an internal combustion engine or to contend with a rotary electric machine that is a vehicle drive source for battery power. The air conditioner controller is configured to switch operation control of the air conditioner between manual control and autonomous control. The autonomous driving controller is configured to perform autonomous driving control of the vehicle. The air conditioner controller is further configured to perform air conditioner power cutting control to regulate driving of the compressor in accordance with required vehicle driving force, during execution of the autonomous control. In a driving switching preparing section of a road wherein autonomous driving performed by the autonomous driving controller is to be switched to manual driving performed by a driver, the air conditioner controller is configured to prohibit performance of the air conditioner power cutting control.

The above configuration secures a defogging function for a windshield glass while the vehicle is travelling in the driving switching preparing section.

In the above configuration, the air conditioner controller may include a fogging determining unit configured to determine whether fogging occurs on a windshield glass. In this case, in response to determining occurrence of fogging on the windshield glass by the fogging determining unit in the driving switching preparing section, the air conditioner controller prohibits execution of the air conditioner power cutting control.

The above configuration enables performance of the air conditioner power cutting control in the absence of windshield glass fogging. Therefore, to travel the driving switching preparing section including an uphill, the air conditioner power cutting control is performed to enable securing of the vehicle driving force.

In the above configuration, the autonomous driving controller may continue the autonomous driving control in the driving switching preparing section until the fogging determining unit determines elimination of fogging on the windshield glass.

This configuration enables switching from autonomous driving to manual driving after securing the driver's field of view.

The specification further discloses a non-transitory recording medium storing a vehicle air conditioner control program. This program causes a computer to be used with an air conditioner and an autonomous driving controller to function as an air conditioner controller. The air conditioner includes a compressor configured to contend with a driving wheel for torque of an internal combustion engine or to contend with a rotary electric machine that is a vehicle drive source for battery power. The autonomous driving controller is configured to perform autonomous driving control of a vehicle. This program enables the air conditioner controller to switch operation control of the air conditioner between manual control and autonomous control. This program further enables the air conditioner controller to perform air conditioner power cutting control to regulate driving of the compressor in accordance with required vehicle driving force during execution of the autonomous control. This program further allows the autonomous driving controller to prohibit performance of the air conditioner power cutting control in a driving switching preparing section of a road wherein autonomous driving performed by the autonomous driving controller is switched to manual driving performed by a driver.

In the above configuration, the air conditioner controller may include a fogging determining unit configured to determine whether fogging occurs on a windshield glass. In this case, in response to determining occurrence of fogging on the windshield glass by the fogging determining unit in the driving switching preparing section, the air conditioner controller prohibits performing of the air conditioner power cutting control.

In the above configuration, the autonomous driving controller may continue the autonomous driving control in the driving switching preparing section until the fogging determining unit determines elimination of fogging on the windshield glass.

The vehicle air conditioner control system according to the present specification enables securing of the defogging function for the windshield glass at the time of switching from autonomous driving to manual driving.

BRIEF DESCRIPTION OF DRAWINGS

Embodiment(s) of the present disclosure will be described based on the following figures, wherein.

DESCRIPTION OF EMBODIMENTS

Entire Configuration

Figure 1:
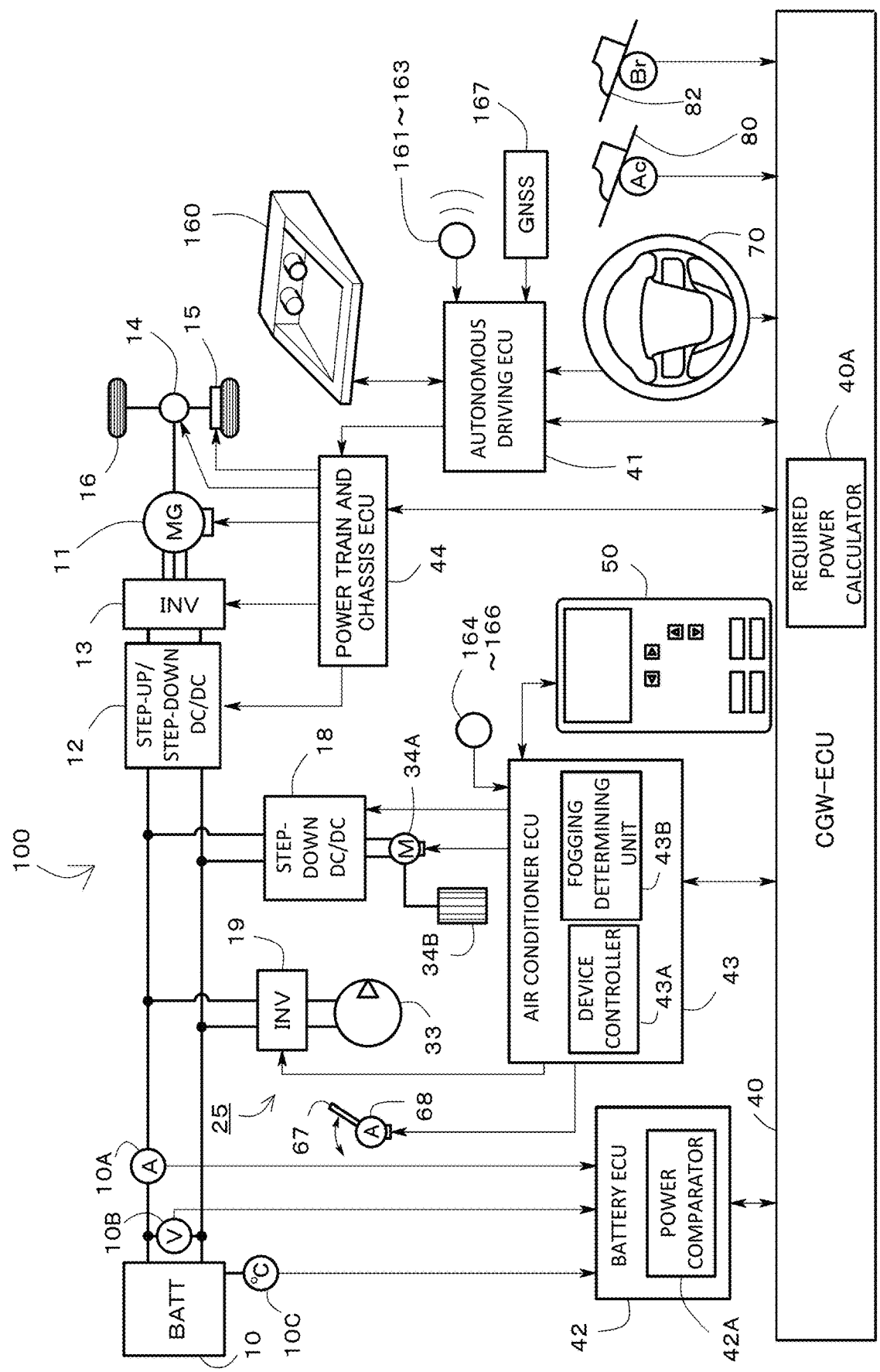
FIG. 1 illustrates a configuration of a vehicle in which a vehicle air conditioner control system according to an embodiment is mounted.

FIG. 1 illustrates the entire configuration of a vehicle 100, including a vehicle air conditioner control system according to an embodiment. FIG. 1 mainly illustrates devices required for autonomous driving control and air conditioning control of the vehicle 100, and does not illustrate devices not significantly related to these controls.

The vehicle 100 may be a battery electric vehicle (BEV) including a rotary electric machine 11, for example, serving as a driving source. However, the vehicle 100 is not limited to a battery electric vehicle (BEV), and may be any vehicle that allows autonomous driving control and also allow contention for torque or electric power between driving of a compressor 33 of an air conditioner 25 and driving of the vehicle, and may be a hybrid electric vehicle (HEV) or a plug-in hybrid electric vehicle (PHEV), for example.

The term "contending" or "contention" as used herein refers to a state wherein a plurality of devices are in a competitive relationship in obtaining a single resource, such as torque or electric power. The greater the allocation of resource to a first device, the less the allocation of the resource to a second device. Under air-conditioner power cutting control which will be described below, the increased allocation of power to vehicle driving results in suppressed driving of the compressor 33.

In the example that is a battery electric vehicle (BEV) illustrated in FIG. 1, the air conditioner 25 and the rotary electric machine 11 that serves as a drive source of the vehicle, contend for the power of a battery 10. The battery 10 is any of a nickel hydrogen battery, a lithium ion battery, and an all solid state battery, for example.

The vehicle 100 includes a high-voltage circuit including the battery 10, a step-up/step-down DC/DC converter 12, inverters 13 and 19, the rotary electric machine 11, and the compressor 33. The direct-current (DC) power output from the battery 10 is boosted, for example, by the step-up/step-down DC/DC converter 12 and is further converted to alternating-current (AC) power by the inverter 13. The converted AC power is supplied to the rotary electric machine 11, which is thus driven and transmits the driving force to driving wheels 16. The DC power output from the battery 10 is also converted orthogonally at the inverter 19 and supplied to the compressor 33.

The high-voltage power from the battery 10 is further stepped down by a step-down DC/DC converter 18 and supplied to a blower motor 34A of the air conditioner 25. The blower motor 34A may be a DC motor, for example, and increases the rotation speed as the applied voltage increases.

For example, the step-down ratio is determined based on the duty ratio in drive signals (e.g., PWM signals) that define on and off of switching elements of the step-down DC/DC converter 18, and the rotation speeds of the blower motor 34A and a blower fan 34B are determined accordingly.

The vehicle 100 further includes a steering wheel 70, an accelerator pedal 80, and a brake pedal 82 that are manual driving mechanisms. The extents of the driver's operation of these mechanisms are transmitted, as electric signals, for example, to a CGW-ECU 40. In response to the signals, the CGW-ECU 40 transmits driving and steering commands to a power train and chassis ECU 44.

The vehicle 100 further includes a camera unit 160, range sensors 161 to 163, a positioning unit 167, and an autonomous driving ECU 41 that are autonomous driving mechanisms, which will be described below.

ECU

As illustrated in FIG. 1, the vehicle 100 includes a plurality of electronic controller units (ECU), which are disposed for each of different functions of the vehicle 100. For example, the vehicle 100 includes the autonomous driving ECU 41 (autonomous driving controller), a battery ECU 42, an air conditioner ECU 43 (air conditioner controller), and the power train and chassis ECU 44. The vehicle 100 further includes the central gateway ECU 40 (which will be also referred to as CGW-ECU as appropriate) that is a higher-level ECU integrating these ECUs for different functions.

The autonomous driving ECU 41 controls autonomous driving of the vehicle 100, as will be described in detail below. The battery ECU 42 controls the SOC and power of the battery 10. The air conditioner ECU 43 controls the air conditioner 25, as will be described in detailed below. The power train and chassis ECU 44 controls the rotary electric machine 11, a steering mechanism 14, and a brake mechanism 15. These individual ECUs are mutually communicable via the CGW-ECU 40, and are connected to the CGW-ECU40 with signal lines in accordance with the CAN (Controller Area Network) standard.

Figure 2:
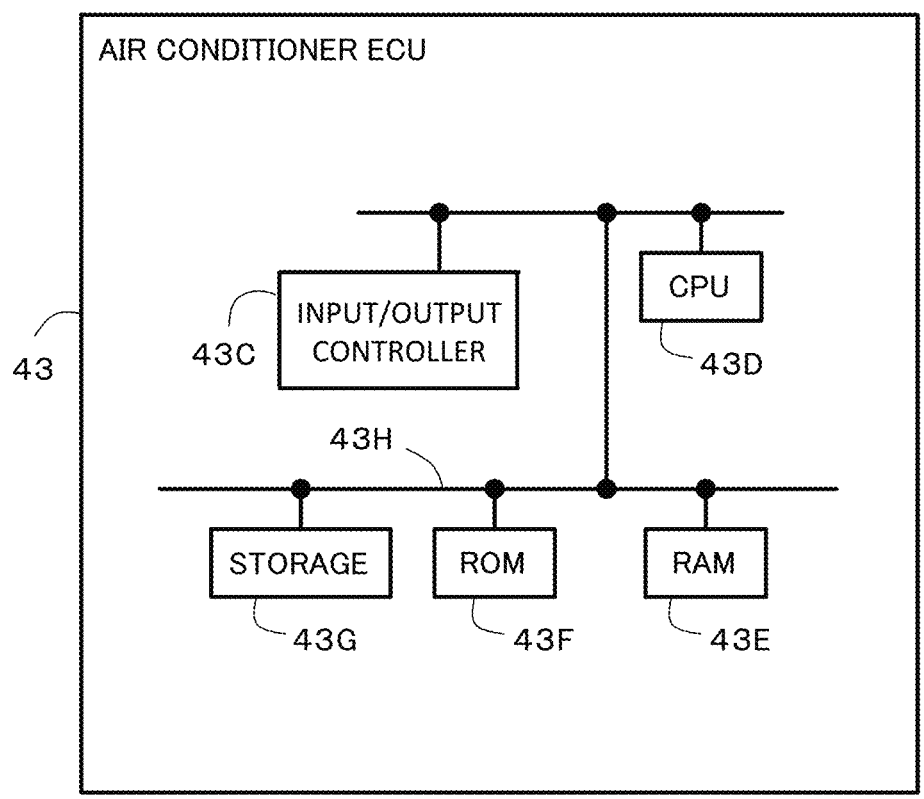
FIG. 2 illustrates a hardware configuration of an air conditioner ECU.

Each of the ECUs for different functions and the CGW-ECU 40 is composed of a computer as illustrated in FIG. 2. FIG. 2 illustrates a hardware configuration of the air conditioner ECU 43. The air conditioner ECU 43 (and other ECUs) includes an input/output controller 43C, a CPU 43D, a RAM 43E, a ROM 43F, and a storage 43G that are mutually communicable through an internal bus 43H.

The input/output controller 43C receives signals output from various sensors mounted on the vehicle 100 and outputs driving commands to on-vehicle devices such as an actuator. The CPU 43D executes operation based on the signals received from the input/output controller 43C and generates and transmits to the input/output controller 43C driving commands to devices to be controlled. The RAM 43E, the ROM 43F, and the storage 43G, for example, are memory elements that store control programs and data detected by the sensors.

Execution of the control program stored in the storage 43G or the ROM 43F by the CPU 43D results in configuration of a device controller 43A and a fogging determining unit 43B in the air conditioner ECU 43, as illustrated in FIG. 1.

Similarly, execution of the control program stored in the storage or ROM of the CGW-ECU40 by the CPU results in configuration of a required power calculator 40A in the CGW-ECU 40.

Execution of the control program stored in the storage or ROM of the battery ECU 42 by the CPU results in configuration of a power comparator 42A that is a function block in the battery ECU 42.

Figure 3:
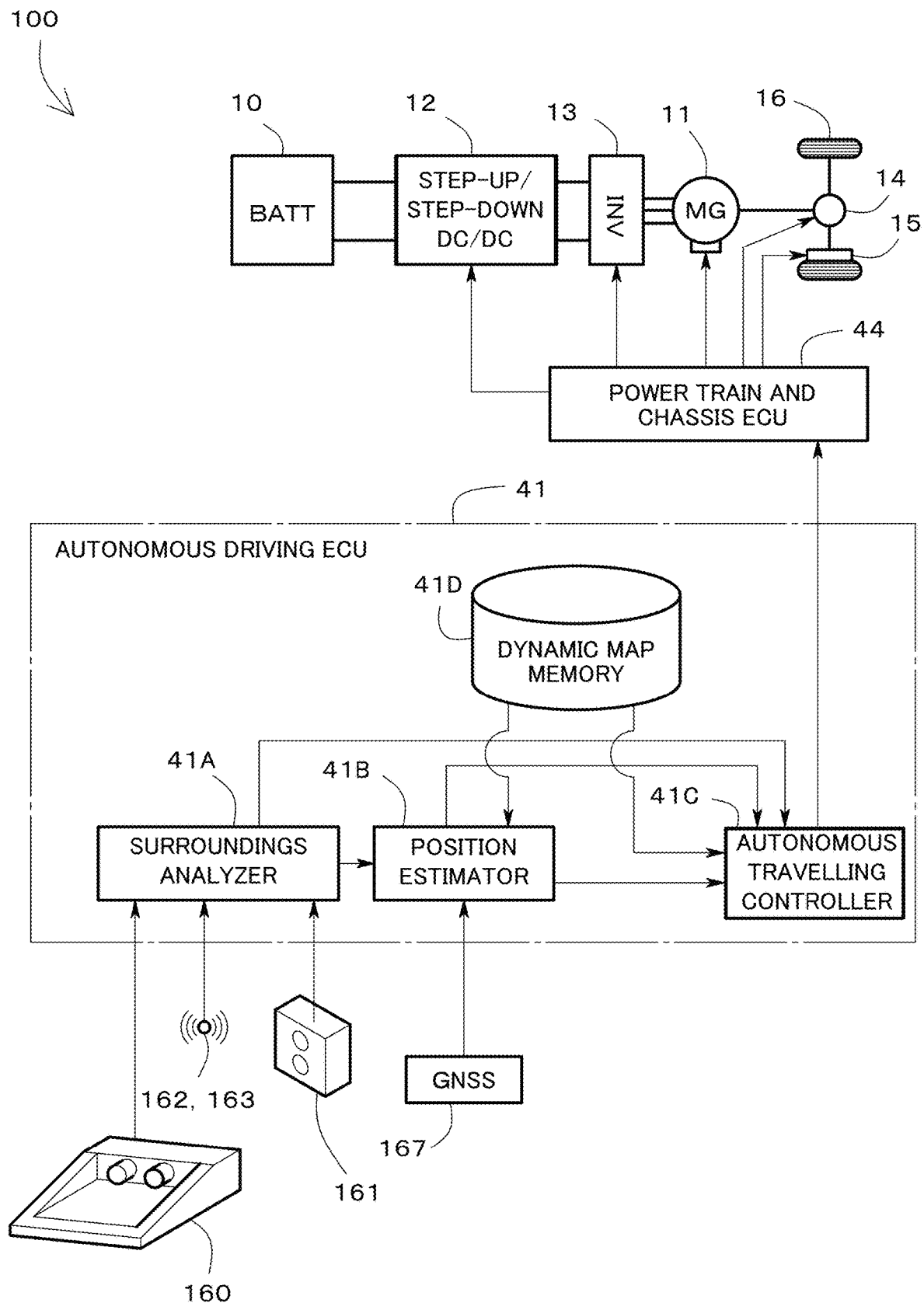
FIG. 3 is a diagram illustrating devices shown in FIG. 1 related to autonomous driving control.

Further, execution of the control program stored in the storage or ROM of the autonomous driving ECU 41 by the CPU results in configuration of a surroundings analyzer 41A, a position estimator 41B, an autonomous travelling controller 41C, and a dynamic map memory 41D that are function blocks in the autonomous driving ECU 41, as illustrated in FIG. 3.

In each of the ECUs described above, the control program may be stored in a non-transitory computer readable storage medium, such as a DVD, rather than the storage or ROM, to allow the CPU to read and execute the control program. Each ECU having such a configuration similarly constitutes the various function blocks illustrated in FIG. 1 and FIG. 3.

Switching Between Autonomous Driving and Manual Driving

FIG. 3 illustrates only elements highly related to autonomous driving control, among the elements illustrated in FIG. 1. The driving control mode of the vehicle 100 is switchable between autonomous driving control performed by the autonomous driving ECU 41 and manual driving control performed by the driver within the vehicle.

The autonomous driving control and the manual driving control may be changed in accordance with the road type along which the vehicle 100 travels, for example. In performing autonomous driving control at Level 2 (autonomous driving on an expressway under the driver's supervision) or Level 3 (autonomous driving on an expressway under supervision of the autonomous driving control system) based on the standards of the Society of Automotive Engineers (SAE), for example, manual driving control is performed on ordinary roads and autonomous driving control is performed on expressways.

Figure 4:
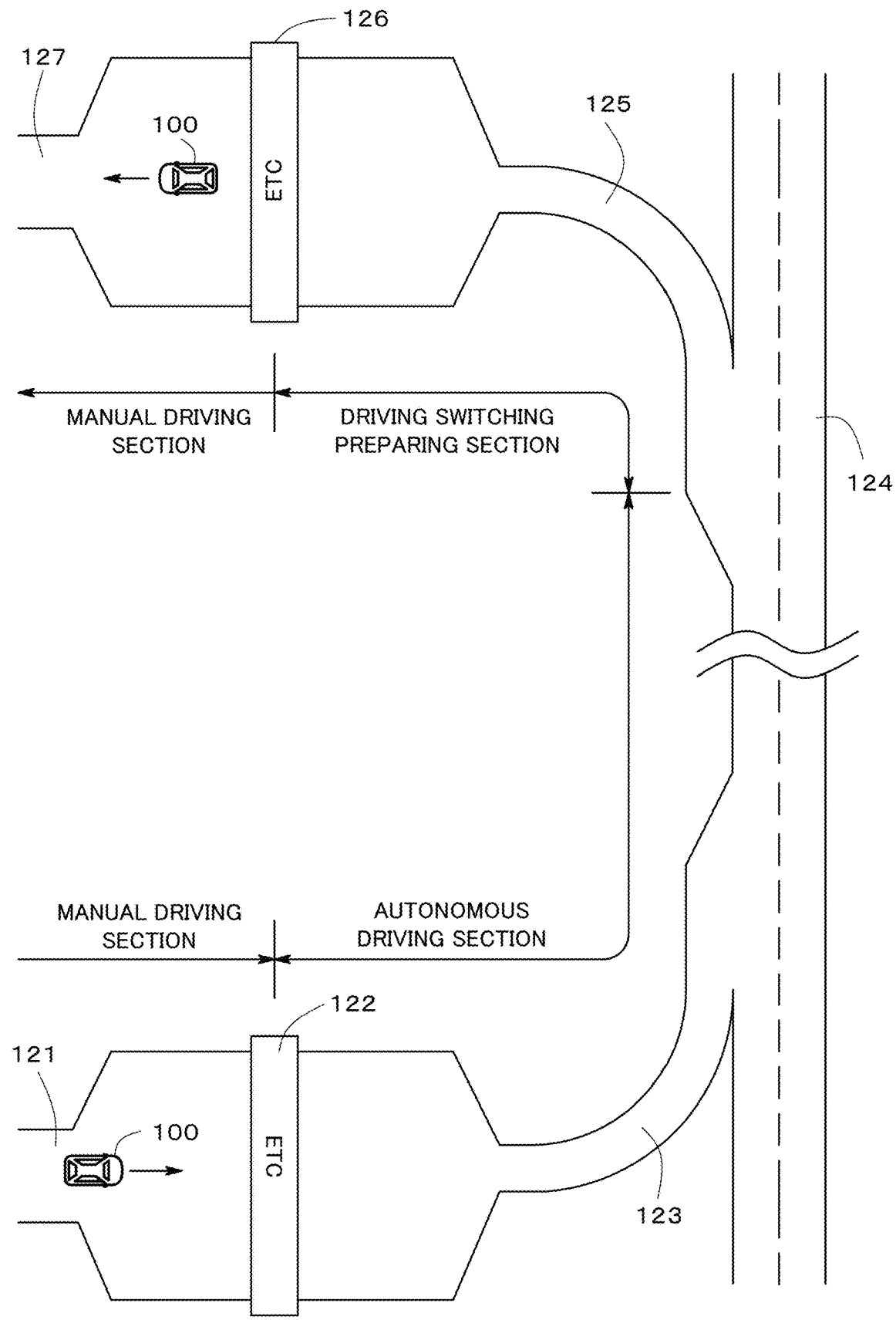
FIG. 4 illustrates an autonomous driving section, a manual driving section, and a driving switching preparing section.

As illustrated in FIG. 4, for example, a section of the road along an ordinary road 121 to a toll gate 122 is a manual driving section in which manual driving control is performed by the driver. A section of the road from the toll gate 122 through an entrance ramp 123 and along an expressway 124 is an autonomous driving section in which autonomous driving control is performed by the autonomous driving ECU 41.

A further section of the road from an exit ramp 125 connecting to a toll gate 126 near the destination to the toll gate 126 is a driving switching preparing section for transferring the driving control from autonomous driving performed by the autonomous driving ECU 41 to manual driving performed by the driver. Then, a section along an ordinary road 127 after the vehicle 100 has passed through the toll gate 126 is a manual driving section.

Figure 5:
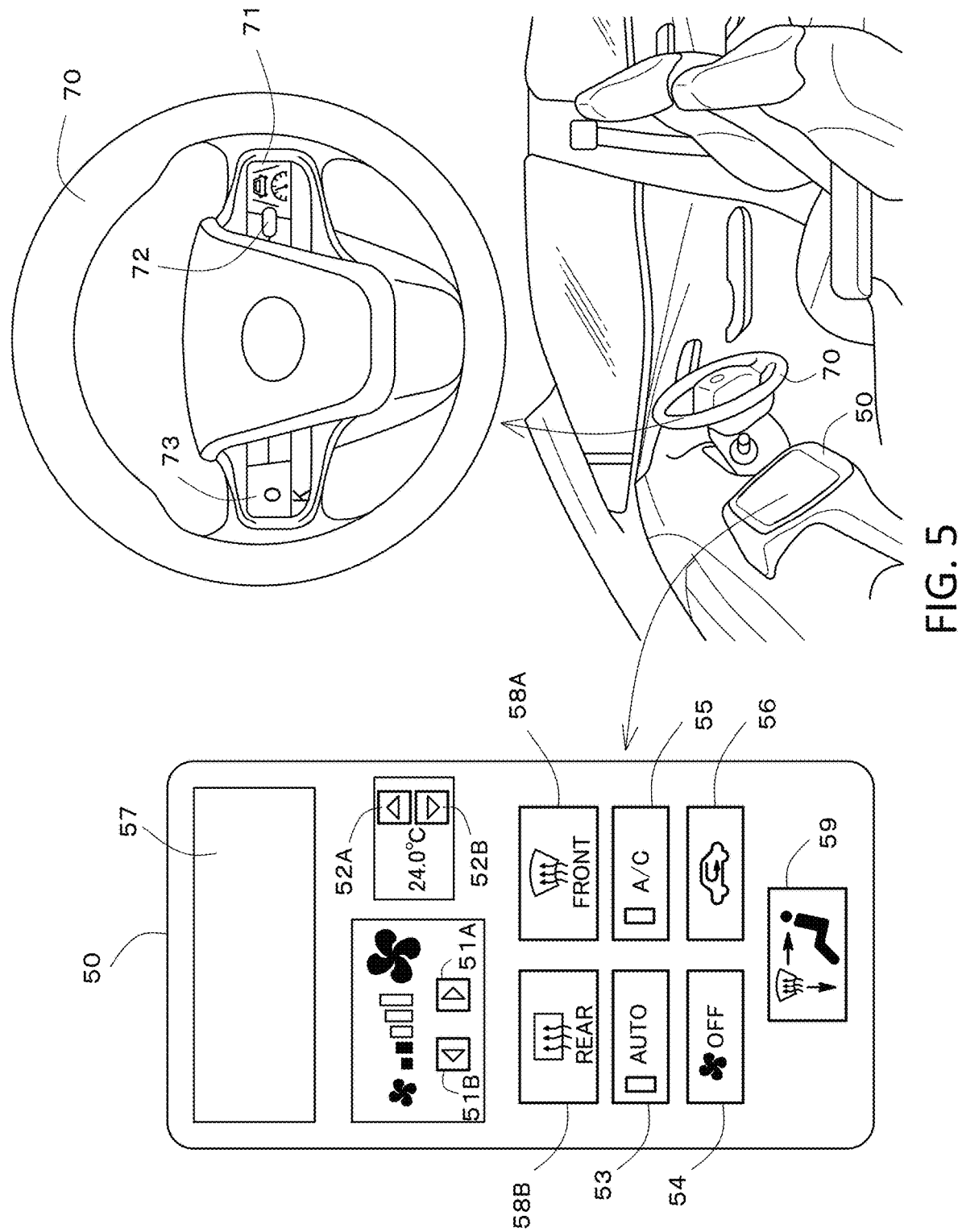
FIG. 5 illustrates switches within the vehicle cabin.

To switch between the manual driving control and the autonomous driving control smoothly, the steering wheel 70, for example, includes a plurality of buttons related to switching of the driving control, as illustrated in FIG. 5, including an autonomous driving button 71, a cancellation button 72, and an OK button 73.

The autonomous driving button 71 is depressed when the driver wishes to execute the autonomous driving control. In response to depression of the autonomous driving button 71 while the vehicle 100 is traveling in a road section targeted for the autonomous driving control, driving control of the vehicle 100 is switched from the manual driving control to the autonomous driving control. The road section targeted for the autonomous driving control refers to an expressway described above or a road section whose map data are stored in the dynamic map memory 41D (see FIG. 3), for example.

In response to depression of the autonomous driving button 71 while the vehicle 100 is travelling in a road section not targeted for the autonomous driving control, the autonomous driving ECU 41 indicates, on a meter panel that is not shown, a message informing that switching to the autonomous driving control is not possible. The road section not intended for the autonomous driving control refers to an ordinary road described above or a road section whose map data are not stored in the dynamic map memory 41D (see FIG. 3).

When the vehicle 100 is travelling in a road section targeted for the autonomous driving control but is under the manual driving control, the autonomous driving ECU 41 indicates, on the meter panel not shown, for example, a message that encourages switching to the autonomous driving control. In response to the driver's depressing of the OK button 73, driving control of the vehicle 100 is switched from the manual driving control to the autonomous driving control. In response to depression of the cancellation button 72 by the driver, driving control according to manual driving continues.

The vehicle 100 travelling in the driving switching preparing section (see FIG. 4) is controlled under the autonomous driving control. During the autonomous driving control in the driving switching preparing section, the autonomous driving ECU 41 indicates, on the meter panel, for example, a message informing that the autonomous driving control is to be changed to the manual driving control.

In response to depression of the OK button 73 by the driver after the above message is indicated, the driving control of the vehicle 100 is changed from the autonomous driving control to the manual driving control. The driving control of the vehicle 100 may also be changed from the autonomous driving control to the manual driving control in response to operation of the steering wheel 70 with a predetermined torque or more, in place of depression of the OK button 73. Further, the driving control of the vehicle 100 may also be changed from the autonomous driving control to the manual driving control in response to operation of the accelerator pedal 80 (see FIG. 1) or the brake pedal 82 with the steering wheel 70 being retained.

In addition to the road type such as an ordinary road or expressway, the weather or device failure may be the basis to determine the manual driving section, the autonomous driving section, and the driving switching preparing section.

In response to the weather surrounding the vehicle 100 becoming inclement or device malfunction, such as optical axis offset, of the camera unit 160 (see FIG. 1, for example) during execution of the autonomous driving control, for example, a message informing switching from the autonomous driving control to the manual driving control is indicated on the meter panel and the like, similar to the case of travelling in the driving switching preparing section described above.

In response to depression of the OK button 73 by the driver or operation of the steering wheel 70, for example, after the above message is indicated, the driving control of the vehicle 100 is switched from the autonomous driving control to the manual driving control.

Meanwhile, in the absence of the driver's operation of the OK button 73, for example, for a predetermined time period after indication of the message, the autonomous driving ECU 41 performs retraction control by moving the vehicle 100 to an edge of the road, for example.

Autonomous Driving Control System

As illustrated in FIG. 3, the vehicle 100 includes sensors for recognizing the surroundings, including the camera unit 160, a lidar sensor 161, and front-side radar sensors 162A and 162B, and a front-center radar sensor 163. The vehicle 100 further includes a sensor for estimating the position of the vehicle 100, or a positioning unit 167.

Figure 6:
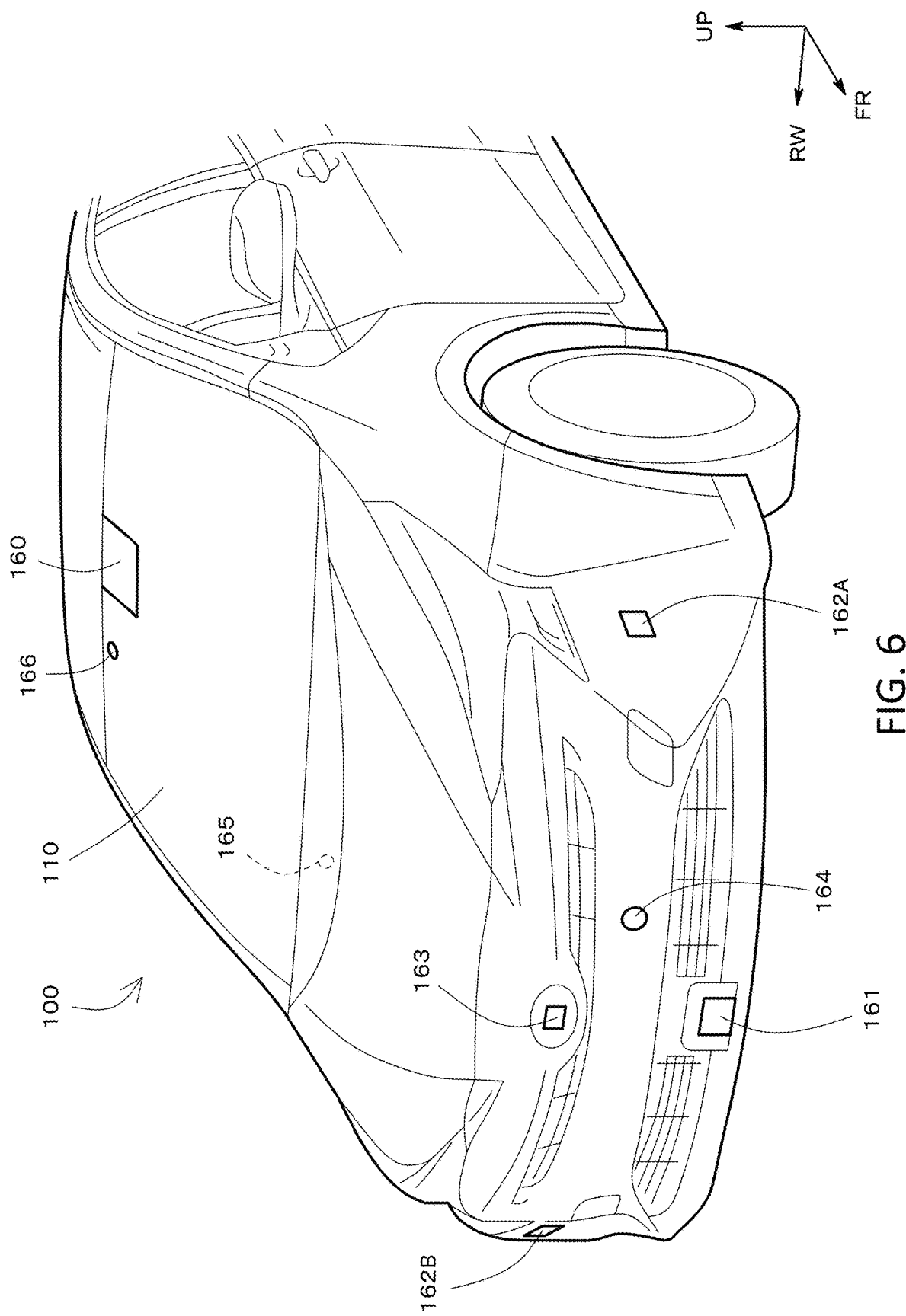
FIG. 6 illustrates sensors disposed in a front of the vehicle.

FIG. 6 illustrates a front portion of the vehicle 100. The vehicle 100 includes the front-center radar sensor 163 on a front face of the vehicle 100 at the back of an emblem in the center along the vehicle width, for example. The vehicle 100 further includes front-side radar sensors 162A and 162B at respective opposite side portions on the front face of the vehicle 100. Each of these radar sensors is composed of a millimeter-wave radar, for example.

The vehicle 100 further includes the lidar sensor 161 on the front face of the vehicle 100 in the center portion along the vehicle width below a portion where the license plate is attached. The lidar sensor 161 employs a technique of measuring the distance to a peripheral object with LiDAR (Light Detection and Ranging) or laser light such as infrared light. The lidar sensor 161 is a solid-state unit, for example, which can acquire three-dimensional point data regarding the surrounding environment of the vehicle 100.

The camera unit 160 is disposed on a rear side of a windshield glass 110 or a face of the windshield glass 110 exposed to the vehicle cabin. The camera unit 160 is disposed in the upper center portion of the windshield glass 110 along the vehicle width, for example.

Figure 7:
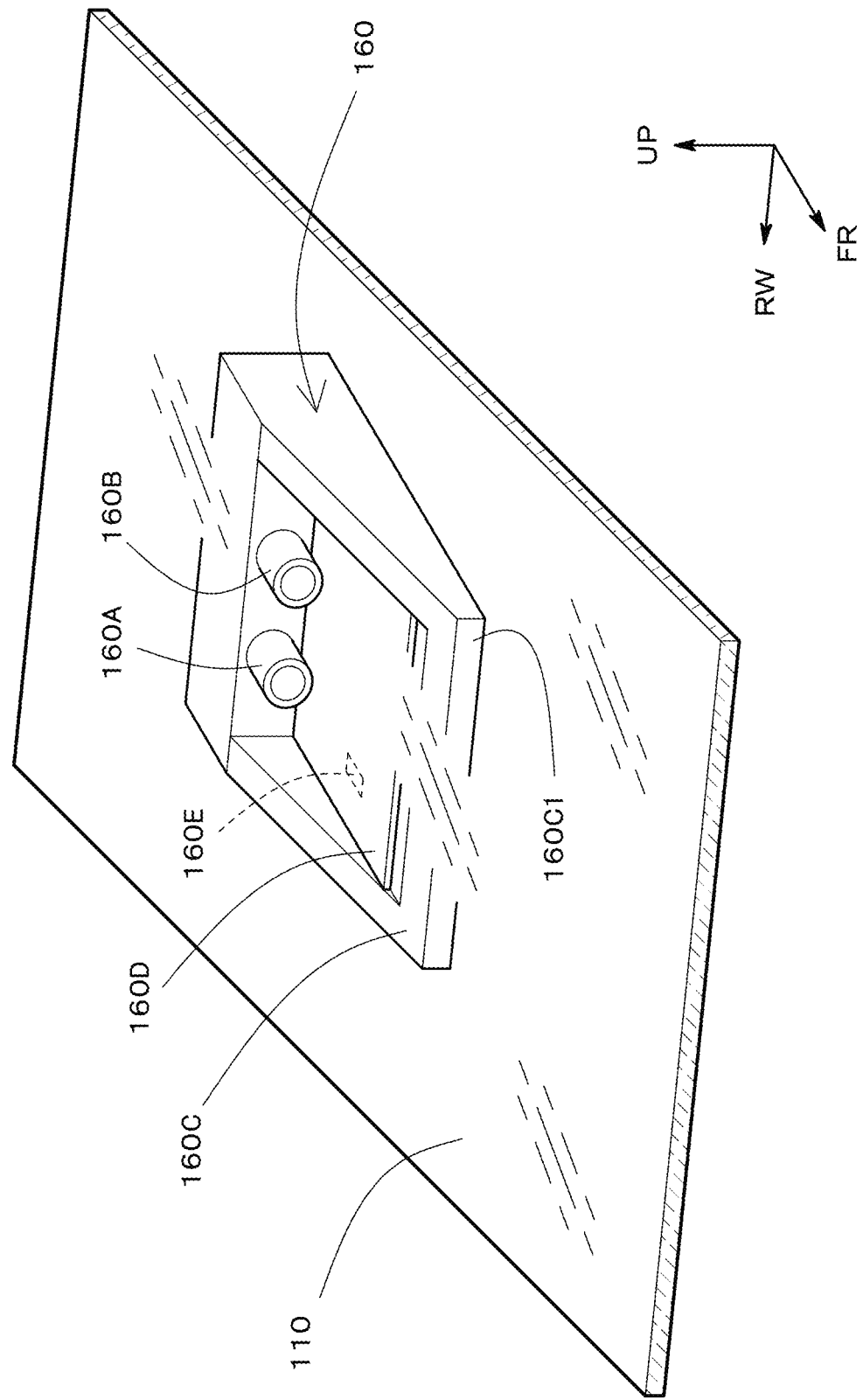
FIG. 7 illustrates an example of a mounted camera unit.

As illustrated in FIG. 7, the camera unit 160 includes cameras 160A and 160B, a casing 160C, and a camera heater 160D. The cameras 160A and 160B or stereo cameras are able to capture images in front of the vehicle through the windshield glass 110.

The cameras 160A and 160B are secured on the casing 160C facing forward of the vehicle with the optical axes being substantially parallel to each other. The casing 160C has a shape similar to that of a dustpan and includes a bottom wall 160C1 extending from under the camera 160A and 160B toward the front of the vehicle, with the front end of the bottom wall 160C1 in contact with the rear face (facing vehicle cabin interior) of the windshield glass 110.

The camera heater 160D is disposed on the bottom wall 160C1 of the casing 160C. The camera heater 160D, which may be an electric wire, includes a temperature sensor 160E The temperature sensor 160E measures the temperature of a region of the windshield glass 110 within the field of view of the cameras 160A and 160B. The temperature sensor 160E measures, for example, the temperature of the region on the windshield glass 110 including points that intersect with the optical axes of the cameras 160A and 160B. In response to the temperature detected by the temperature sensor 160E being lower than a predetermined temperature, for example, the autonomous driving ECU 41 operates the camera heater 160D to defog the region of the windshield glass 110 around the cameras 160A and 160B.

Referring back to FIG. 3, the positioning unit 167 performs measurements by an artificial satellite and may be a global navigation satellite system, for example.

As described above, execution of the control program stored in the storage or ROM of the autonomous driving ECU 41 (autonomous driving controller) by the CPU results in configuration of the function blocks, including the surroundings analyzer 41A, the position estimator 41B, and the autonomous travelling controller 41C in the autonomous driving ECU 41. The dynamic map memory 41D is further configured in the autonomous driving ECU 41, as a memory unit.

The dynamic map memory 41D stores dynamic map as map data. The dynamic map is a three-dimensional map including, for example, data on the position and three-dimensional shape of a road. The three-dimensional shape of a road includes gradient and width, for example. The dynamic map further includes position data of lines on the road, pedestrian crossings, and stop lines, for example. The dynamic map also includes data on positions and three-dimensional shapes of structures surrounding the road, such as stops, buildings, or signals. The dynamic map further includes data on the positions or shapes of parking lots.

The dynamic map further includes, in addition to the static information described above, dynamic information or dynamic data including traffic restriction and construction information, accident or traffic jam information, pedestrian information, or signal information. For example, the dynamic map includes geographic coordinates including latitude and longitude.

The surroundings analyzer 41A acquires captured images from the cameras 160A and 160B, and performs image recognition based on a known deep learning technique with regard to the captured images. The image recognition is performed to detect objects within the captured images and recognize attributes (vehicle, passenger, structure, and the like) of the objects.

The surroundings analyzer 41A further acquires three-dimensional points data from the lidar sensor 161, and creates peripheral data including the image-recognized captured image superposed on the coordinates of the three-dimensional points data. The peripheral data enable detection of the distance from the vehicle 100 of an object having a certain attribute.

The peripheral data may further reflect range information from the front-side radar sensors 162A and 162B (see FIG. 6) or the front-center radar sensor 163. For example, the range information of regions that cannot be measured by the lidar sensor 161 is compensated with range information from these radar sensors. The peripheral data generated by the surroundings analyzer 41A are transmitted to the autonomous travelling controller 41C.

The position estimator 41B acquires positional information (latitude and longitude) of the vehicle 100 from the positioning unit 167. The position estimator 41B acquires the positional information from the artificial satellite. The positional information (vehicle positional information) thus acquired is transmitted to the autonomous travelling controller 41C.

The autonomous travelling controller 41C controls travelling of the vehicle 100 based on the map data stored in the dynamic map memory 41D, the positional information (vehicle positional information) transmitted from the position estimator 41B, and the peripheral data transmitted from the surroundings analyzer 41A.

For example, a global route is determined from the road information and destination information stored in the map data, and the positional information. A local route is further determined from the peripheral data. The autonomous travelling controller 41C combines the global data and the local data to generate steering commands and speed commands, which are then transmitted to the power train and chassis ECU 44. The power train and chassis ECU 44, based on the received steering commands and speed commands, controls the steering mechanism 14, the brake mechanism 15, the step-up/step-down DC/DC converter 12, and the inverter 13.

Air Conditioner

Figure 8:
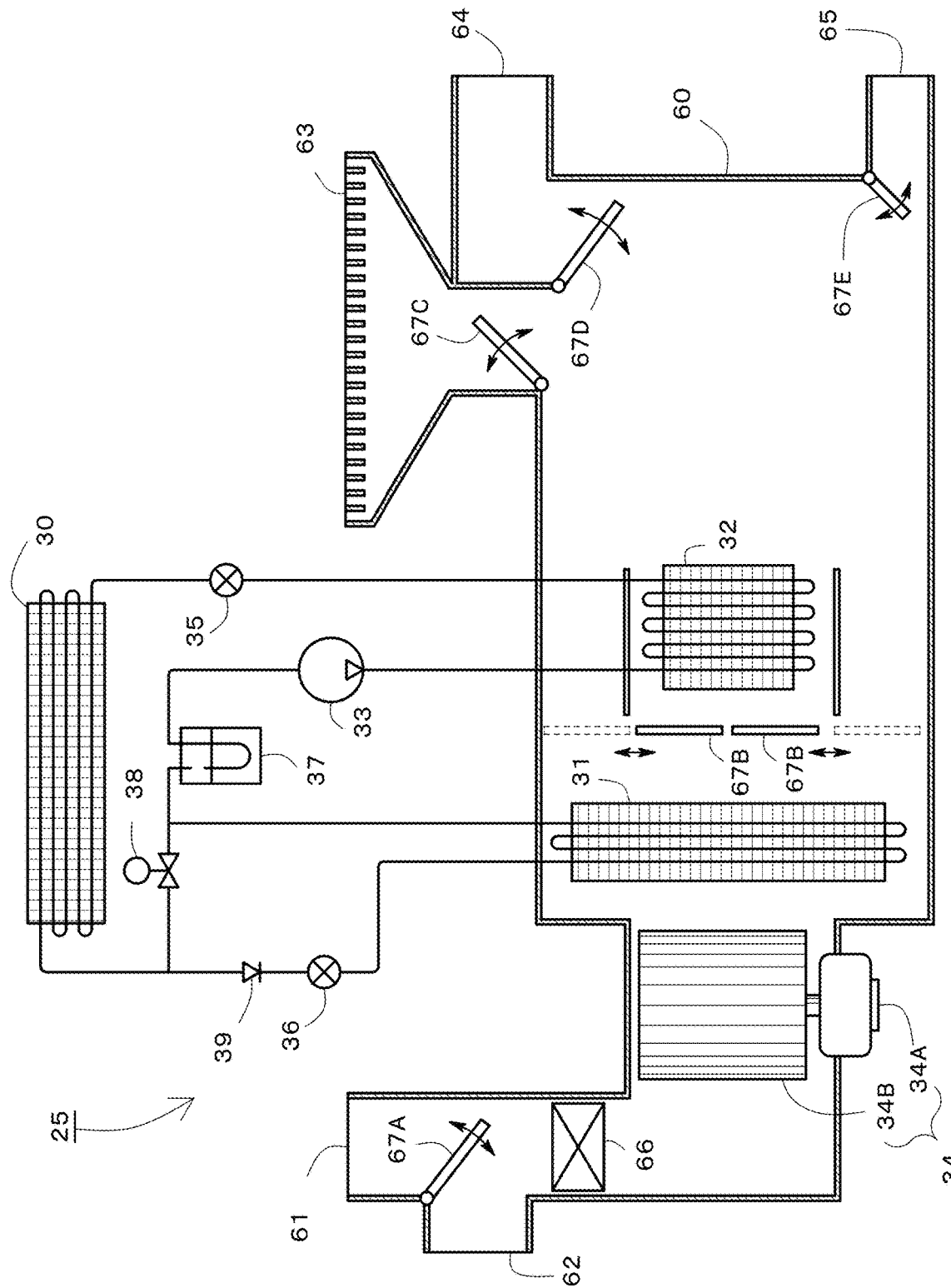
FIG. 8 illustrates an air conditioner.

As illustrated in FIG. 1 and FIG. 8, the air conditioner 25 includes electric devices including the step-down DC/DC converter 18, the inverter 19, the compressor 33, the blower motor 34A, and an actuator 68. Referring further to FIG. 8, the air conditioner 25 includes devices disposed on the flow passage of the refrigerant, including, in addition to the compressor 33, an outdoor condenser 30 (radiator), an evaporator 31, an indoor condenser 32, expansion valves 35 and 36, an accumulator 37, an electromagnetic valve 38, and a check valve 39. In addition, the air conditioner 25 includes controllers, including the air conditioner ECU 43 and an air conditioner control panel 50.

Referring to FIG. 8, the air conditioner 25 for vehicle cabin mounted in the vehicle 100 is a heat pump air conditioner. Devices of the air conditioner 25, including the compressor 33, the blower 34, and the actuator 68 (see FIG. 1), are electric machines to be driven with the power of the battery 10.

As illustrated in FIG. 8, the blower 34 includes the blower motor 34A and the blower fan 34B. The blower motor 34A may be a DC motor, for example, and increases the rotation speed with the increase of the applied voltage. The power from the battery 10 is supplied, via the step-down DC/DC converter 18, to the blower motor 34A. A drive signal (a PWM signal, for example) that determines on or off of a switching element of the step-down DC/DC converter 18 is generated by the device controller 43A of the air conditioner ECU 43. The step-down ratio of the step-down DC/DC converter 18 is determined based on the duty ratio of the drive signal to the step-down DC/DC converter 18, and the rotation speeds of the blower motor 34A and the blower fan 34B are determined in accordance with the step-down ratio.

The compressor 33 is a motor-installed electrically driven device, and receives electric power supplied from the battery 10 via the inverter 19, as illustrated in FIG. 1. A drive signal (a PWM signal, for example) that determines on or off of a switching element of the inverter 19 is generated by the device controller 43A of the air conditioner ECU 43. The rotation speed of the compressor 33 is determined based on the duty ratio of the drive signal.

The electrical compressor 33, such as a motor-driven compressor 33, requires more electrical power to obtain driving torque of the compressor 33, as compared to a conventional compressor 33 driven by the internal combustion engine. The electric devices in the vehicle 100 that require the greatest amounts of electric power are the rotary electric machine 11 that is a drive source, and the compressor 33 consumes the second greatest amount of electric power. For example, the audio system or the navigation system consumes power in the units of watt W, whereas the compressor 33 consumes power in the units of kilowatt kW.

The air conditioner 25 includes a duct 60 (see FIG. 8) that controls the air flow. The duct 60 includes, at an upstream end, an inside air inlet 61 and an outside air inlet 62. The inside air inlet 61 is disposed within the vehicle cabin, and the outside air inlet 62 is disposed outside the vehicle. The mixture ratio of the inside air and the outside air to be taken into the duct 60 is determined in accordance with the setting angle of an inside/outside air switching door 67A.

The air taken through at least one of the inside air inlet 61 and the outside air inlet 62 is absorbed by the blower fan 34B and passes the evaporator 31 via an air cleaner 66. When an air mix door 67B closes the indoor condenser 32, the air bypasses the indoor condenser 32 and flows. The air is also discharged into the vehicle cabin from at least any one of a front defroster duct 63, a face or upper register 64, and a foot or lower register 65. The amounts of discharge of the air from the front defroster duct 63, the upper register 64, and the lower register 65 are determined in accordance with the degrees of opening of a defroster door 67C, a face or upper door 67D, and a foot or lower door 67E, respectively.

The degrees of opening of the inside/outside air switching door 67A, the air mix door 67B, the defroster door 67C, the upper door 67D, and the lower door 67E (illustrated as 67 in FIG. 1) are adjusted by the actuator 68 illustrated in FIG. 1. The device controller 43A of the air conditioner ECU 43 controls the degrees of opening of these doors based on the setting, for example, of a vent selection switch 59 (see FIG. 5) and other devices.

Figure 9:
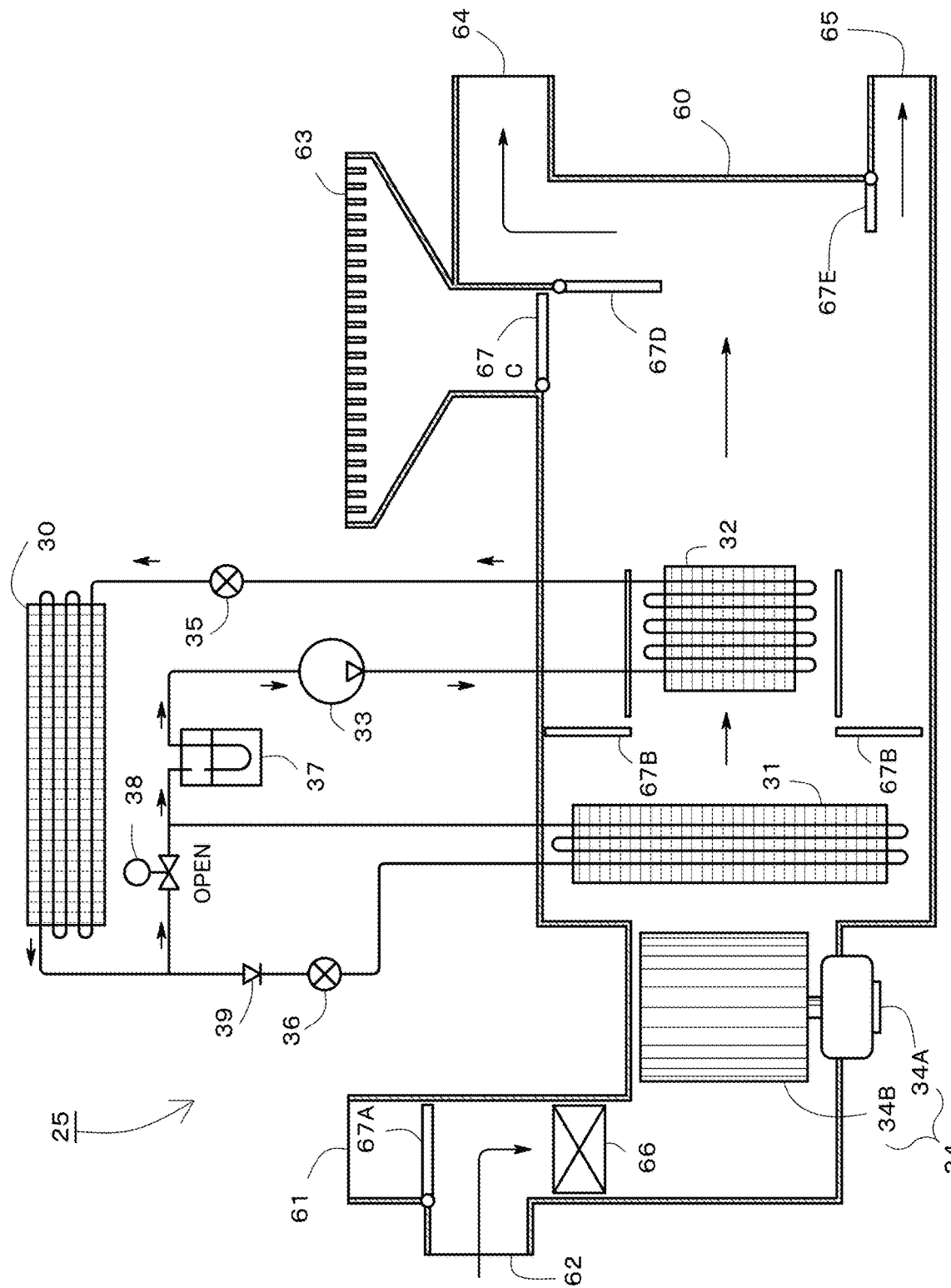
FIG. 9 illustrates operation of the air conditioner during heating operation.

FIG. 9 illustrates the flow of a refrigerant during use of the heating function of the air conditioner 25. In heating, the air mix door 67B is completely open to the room condenser 32. When an inside/outside air changing switch or an air recirculation switch 56 (see FIG. 5) for switching between inside air and outside air is turned off, the outside air is introduced into the duct 60 through the outside air inlet 62.

The air (outside air) is introduced from the blower 34 to the room condenser 32 as the high-temperature refrigerant compressed by the compressor 33 passes through the room condenser 32. The air having passed through the room condenser 32, which is hot air, is discharged from at least one of the front defroster duct 63, the upper register 64, or the lower register 65 into the vehicle cabin.

The refrigerant passing through the room condenser 32 is decompressed by the expansion valve 35. The decompressed refrigerant having a temperature below the outside air absorbs heat at the time of passing the outdoor condenser 30. The refrigerant is further compressed by the compressor 33 via the electromagnetic valve 38 and the accumulator 37.

Figure 10:
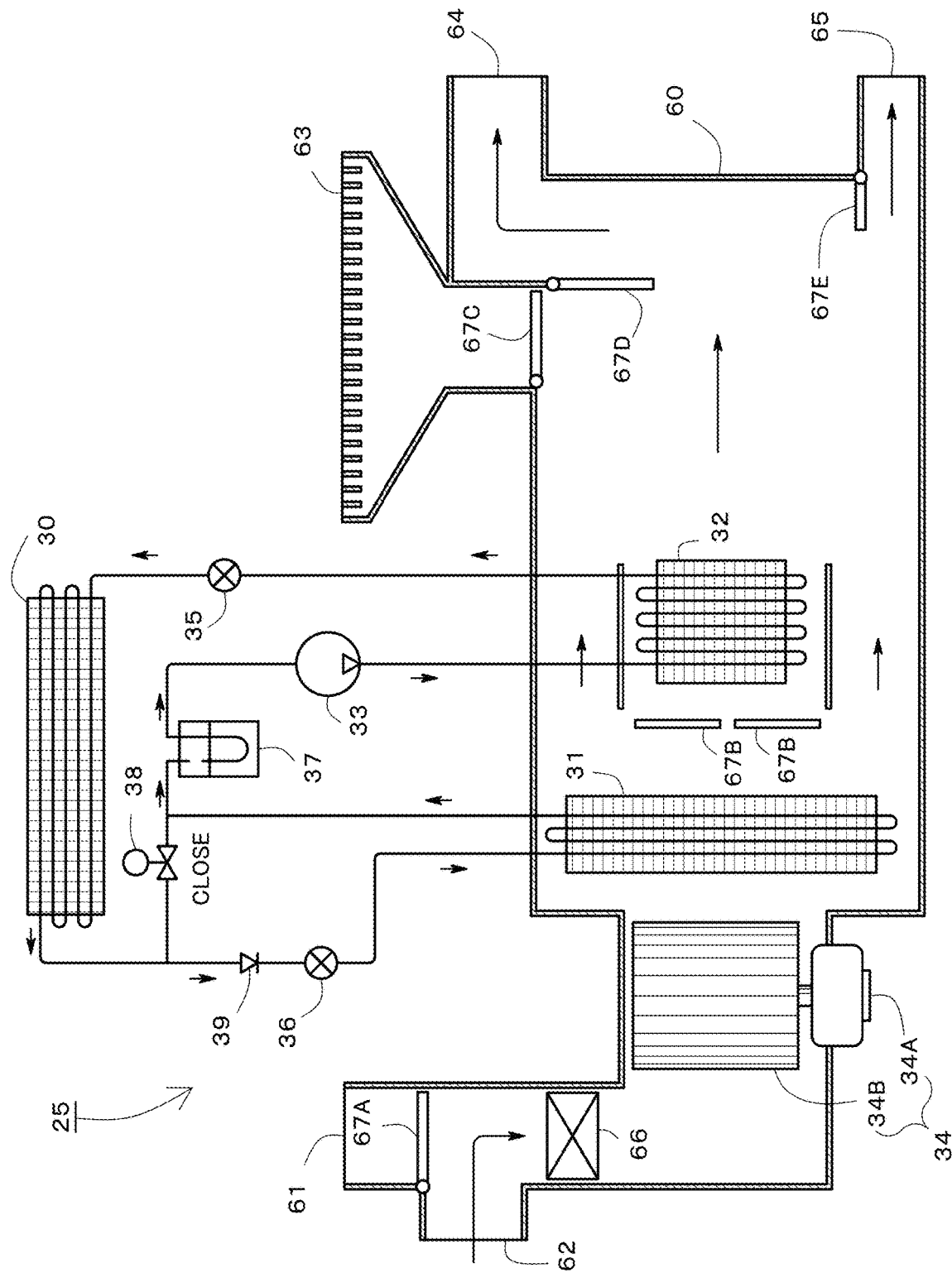
FIG. 10 illustrates operation of the air conditioner during a cooling mode.

FIG. 10 illustrates the flow of the refrigerant during use of the cooling function of the air conditioner 25. In cooling, the air mix door 67B is completely closed with respect to the room condenser 32. When the air recirculation switch 56 (see FIG. 5) is turned off, the outside air is introduced into the duct 60 through the outside air inlet 62.

The high-temperature refrigerant compressed by the compressor 33 is decompressed at the expansion valve 35 via the room condenser 32. The decompressed refrigerant having a higher temperature than the outside air dissipates heat at the time of passing the outside condenser 30. The refrigerant is further decompressed at the expansion valve 36 into a mist state with a low temperature and a low pressure.

As this refrigerant passes the evaporator 31, the air from the blower 34 also passes the evaporator 31, and the cool air is to be supplied to the vehicle cabin. The refrigerant after heat exchange is separated into a gas refrigerant and a liquid refrigerant by the accumulator 37, and the gas refrigerant is delivered to the compressor 33.

Figure 11:
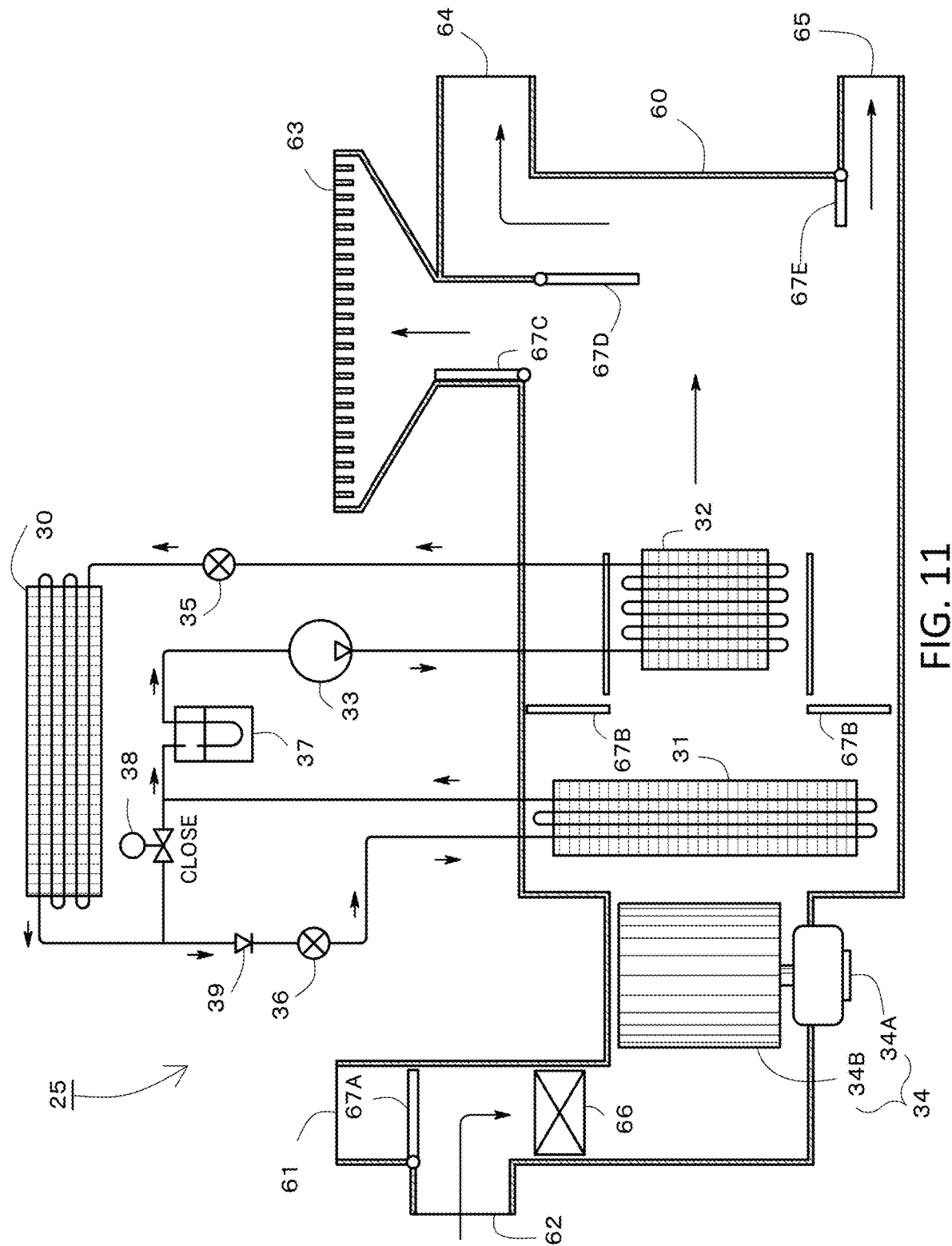
FIG. 11 illustrates operation of the air conditioner during a dehumidifying mode.

FIG. 11 illustrates the flow of the refrigerant during use of the dehumidification function of the air conditioner 25. The operation of the air conditioner 25 during execution of the dehumidification is substantially the same as that at the time of cooling; however, the air mix door 67B is opened to the room condenser 32.

The driving conditions of the compressor 33 are set such that the air passing the evaporator 31 has a temperature that is lower than the set temperature. Specifically, the air having a temperature lower than the set temperature temporarily reduces the saturated vapor volume of the air and removes the water content within the air as water drops. Subsequently, the air is further allowed to pass through the room condenser 32 to thereby raise the air temperature to the set temperature. This allows dry air to be supplied into the vehicle cabin.

Air Conditioner Control

As illustrated in FIG. 5, the operation of the air conditioner 25 is set by the air conditioner control panel 50, which is disposed on the instrument panel near the driver's seat, for example.

The air conditioner control panel 50 may be a touch screen having an input portion and a display portion overlapped with each other. The air conditioner control panel 50 includes air volume control buttons 51A and 51B, temperature setting buttons 52A and 52B, an auto switch 53, and a blower switch 54. The air conditioner control panel 50 further includes an air conditioner switch 55, the air recirculation switch 56, a display 57, a defroster switch 58A, a rear defogger switch 58B, and the vent selection switch 59. These buttons and switches have known functions, which will not be described here.

Signals generated by operation of the various switches and buttons of the air conditioner control panel 50 are transmitted to the air conditioner ECU 43 (air conditioner controller, see FIG. 1). The device controller 43A of the air conditioner ECU 43 can switch the control mode of the air conditioner 25 between manual control and autonomous control in accordance with inputs to the air conditioner control panel 50.

For example, in response to an ON operation of the auto switch 53, the air conditioner ECU 43 performs autonomous control with respect to the air conditioner 25. The ON operation refers, for example, to changing of indication of a lamp (or its image) of the auto switch 53 from light-off indication to light-on indication.

Meanwhile, the operation to change the indication of the lamp from the light-on state to the light-off state is referred to as an OFF operation. In response to the OFF operation of the auto switch 53, the air conditioner ECU 43 executes manual control to control the air conditioner 25 in accordance with the operation of the various switches of the air conditioner control panel 50.

During the ON operation of the air recirculation switch 56, the inside air is circulated within the vehicle cabin. As the circulation of the inside air increases moisture of the air within the vehicle cabin and results in condensation and fogging on the windshield glass 110, an occupant such as a driver turns on the defroster switch 58A.

In response to this ON operation, the device controller 43A of the air conditioner ECU 43 performs the following defogging operation. Specifically, the device controller 43A sets the air conditioner 25 to the dehumidification operation state illustrated in FIG. 11. The device controller 43A further operates the inside/outside air switching door 67A to introduce the outside air and completely open the defroster door 67C. The device controller 43A also maximizes the rotation speed of the blower fan 34B. This operation dehumidifies the outside air introduced into the duct 60 at the time of passing the evaporator 31, and supplies a large volume of the dehumidified air (dry air) from the front defroster duct 63 to the windshield glass 110, thereby defogging the windshield glass 110.

In autonomous control, in contrast, autonomous air conditioner control (including the defogging operation) is executed. For the autonomous control, the vehicle 100 includes a plurality of sensors. As illustrated in FIG. 6, for example, the vehicle 100 includes an outside air temperature sensor 164, an inside air temperature sensor 165, and a humidity sensor 166. The outside air temperature sensor 164 is disposed on the front bumper on the front face of the vehicle, for example. The inside air temperature sensor 165 is disposed on a steering column within the vehicle cabin, for example. The humidity sensor 166 is disposed on, for example, a rear face of the windshield glass 110 or a face exposed to the vehicle cabin. In the example illustrated in FIG. 6, for example, the humidity sensor 166 is disposed near the camera unit 160.

Detected values from the outside air temperature sensor 164, the inside air temperature sensor 165, and the humidity sensor 166 are transmitted to the fogging determining unit 43B of the air conditioner ECU 43. The fogging determining unit 43B, based on the detected values from the outside air temperature sensor 164, the inside air temperature sensor 165, and the humidity sensor 166, determines whether fogging occurs on the windshield glass 110.

For example, in response to the outside air temperature detected by the outside air temperature sensor 164 being a threshold value or lower, the fogging determining unit 43B determines occurrence of fogging of the windshield glass 110. In response to the occurrence of fogging determined by the fogging determining unit 43B, the device controller 43A executes the defogging operation described above. After a predetermined time period (20 seconds, for example) of continued defogging operation, the fogging determining unit 43B determines that fogging has been eliminated. In response, the device controller 43A restores the control state before the defogging operation.

Alternatively, occurrence of fogging of the windshield glass 110 may be determined based on the detection result of the humidity sensor 166. In response to the humidity near the windshield glass 110 detected by the humidity sensor 166 being a predetermined threshold humidity or higher, the fogging determining unit 43B determines occurrence of fogging of the windshield glass 110. In response to this determination, the device controller 43A performs the defogging operation described above. Subsequently, in response to the humidity detected by the humidity sensor 166 being below the threshold humidity, the fogging determining unit 43B determines defogging of the windshield glass 110. In response, the device controller 43A restores the control state before the defogging operation.

Occurrence of fogging of the windshield glass 110 may also be determined based on a difference between the temperature detected by the outside air temperature sensor 164 and the temperature detected by the inside air temperature sensor 165. In response to the temperature detected by the outside air temperature sensor 164 being the threshold temperature or lower and the difference determined by subtracting the temperature detected by the outside air temperature sensor 164 from the temperature detected by the inside air temperature sensor 165 being a predetermined threshold temperature difference or greater, for example, the fogging determining unit 43B determines occurrence of fogging on the windshield glass 110. In response to this determination, the device controller 43A executes the defogging operation described above. After a predetermined time period (20 seconds, for example) of continued defogging operation, the fogging determining unit 43B determines defogging. In response, the device controller 43A restores the control state before the defogging operation.

In addition, fogging may be determined based on weather information acquired from an external weather forecasting organization, for example. The fogging determining unit 43B may acquire weather information of an area where the vehicle 100 is travelling. The fogging determining unit 43B further determines whether fogging occurs on the windshield glass 110 based on the outside air humidity information included in the weather information.

Air Conditioner Power Cutting Control

As described above, the compressor 33 and the rotary electric machine 11 contend for power of the battery 10. To secure the vehicle driving force during the autonomous control of the air conditioner 25, the air conditioner power cutting control can be executed. The air conditioner power cutting control is performed to control driving of the compressor 33 in accordance with the required vehicle driving force.

As illustrated in FIG. 1, the required power calculator 40A of the CGW-ECU 40 receives, from the autonomous driving ECU 41, data of power to be supplied to the rotary electric machine 11 that is a vehicle drive source, or data of required driving power or required vehicle driving force. The required power calculator 40A further receives, from the air conditioner ECU 43, data of power to be supplied to the air conditioner 25, particularly to the compressor 33, or data of required air conditioning power. The required power calculator 40A further determines, and sends to the battery ECU 42, data of the required total power including the required driving power and the required air conditioning power.

The battery ECU 42 determines State of Charge (SOC) or charging rate of the battery 10 based on detected values from a current sensor 10A, a voltage sensor 10B, and a temperature sensor 10C, for example. The battery ECU 42 further determines State of Power (SOP) or chargeable/dischargeable power of the battery 10 based on the determined SOC. The SOC and SOP can be obtained in known manners, which will not be described here.

The battery ECU 42 further determines whether or not the value of the required total power received from the CGW-ECU 40 exceeds the SOP of the battery 10. In response to the required total power exceeding the SOP, the battery ECU 42 requests the CGW-ECU 40 for reduction of the required total power.

The CGW-ECU 40, in response, cuts down the required air conditioning power of the required total power, and instructs the air conditioner ECU 43 to execute the air conditioner power cutting control. For example, the CGW-ECU 40 reduces power required for driving the compressor 33 of the required total power.

In response to the instruction to execute the air conditioner power cutting control, the device controller 43A of the air conditioner ECU 43 regulates driving of the compressor 33. For example, the device controller 43A controls driving of the compressor 33 to reduce the output of the compressor 33 by reducing the required output by a predetermined ratio.

In a typical example of the air conditioner power cutting control, the power required for driving the compressor 33 is reduced (to 0). In response, the device controller 43A stops the inverter 19 to thereby stop supply of power to the compressor 33. This temporarily stops temperature regulation by the air conditioner 25, and the outside air or inside air (with unregulated temperature) is delivered into the vehicle cabin by the blower 34, for example.

When fogging occurs on the windshield glass 110 due to regulation of driving of the compressor 33 under the air conditioner power cutting control, the driver or occupant depresses the defroster switch 58A (see FIG. 5). This operation interrupts the autonomous control of the air conditioner 25 and therefore interrupts the air conditioner power cutting control that is a subordinate control flow of the autonomous control.

In such a case, the CGW-ECU 40 cuts down the required driving power from the required total power. This reduces the driving force of the vehicle relative to the required value (or required vehicle driving force); however, the defogging function is secured.

Air Conditioner Control in Autonomous Driving section

During execution of the autonomous driving control by the autonomous driving ECU 41; that is, while the vehicle 100 is travelling in the autonomous driving section, the various sensors including the camera unit 160 are used to confirm the surroundings ahead of the vehicle 100. At this time, as it is only required that the field of view near the camera unit 160 is secured for the autonomous driving control, defogging of the entire windshield glass 110 is not necessary.

Therefore, during execution of the autonomous driving control with the autonomous control being selected for the air conditioner 25, the fogging determining unit 43B loosens the criteria for determining fogging relative to that used during execution of the manual driving control. For example, the fogging determining unit 43B stops fogging determination during execution of the autonomous driving control.

The a power comparator 42A of the battery ECU 42 changes the determination criteria to further promote performance of the air conditioner power cutting control as compared to that used during execution of the manual driving control. For example, the power comparator 42A uses, as the reference value, a value which is a predetermined ratio (80%, for example) of the SOP of the battery 10. In response to the value of the required total power received from the CGW-ECU 40 exceeding the reference value, the battery ECU 42 requests the CGW-ECU 40 to reduce the required total power.

In response to this request, the CGW-ECU 40 cuts down the required air conditioning power of the required total power and instructs the air conditioner ECU 43 to execute the air conditioner power cutting control. For example, the CGW-ECU 40 cuts down the power required for driving the compressor 33 from the required total power.

As described above, during execution of the autonomous driving control and the autonomous control for the air conditioner, the fogging determination is stopped, and the criteria for performing the air conditioner power cutting control are loosened (the control becomes easier to execute). Meanwhile, the temperature detected by the temperature sensor 160E (see FIG. 7) of the camera unit 160 is continuously transmitted to the autonomous driving ECU 41. The autonomous driving ECU 41, in accordance with the temperature detected by the temperature sensor 160E, operates the camera heater 160D to maintain good field of view around the cameras 160A and 160B.

For example, in response to the temperature detected by the temperature sensor 160E being below the threshold temperature, the autonomous driving ECU 41 operates the camera heater 160D to defog the area of the windshield glass 110 around the cameras 160A and 160B.

However, during execution of the autonomous driving control but without the autonomous control being selected, the normal determination criteria are used to determine fogging. Further, the air conditioner power cutting control is executed only during execution of the autonomous control of the air conditioner 25 and would not be executed without the autonomous control being selected.

Thus, in response to fogging of the windshield glass 110 during execution of the autonomous driving control, for example, the occupant depresses the defroster switch 58A to actuate the defogging operation described above, thereby defogging the windshield glass 110.

Air Conditioner Control in Driving Switching Preparing Section

Figure 12:
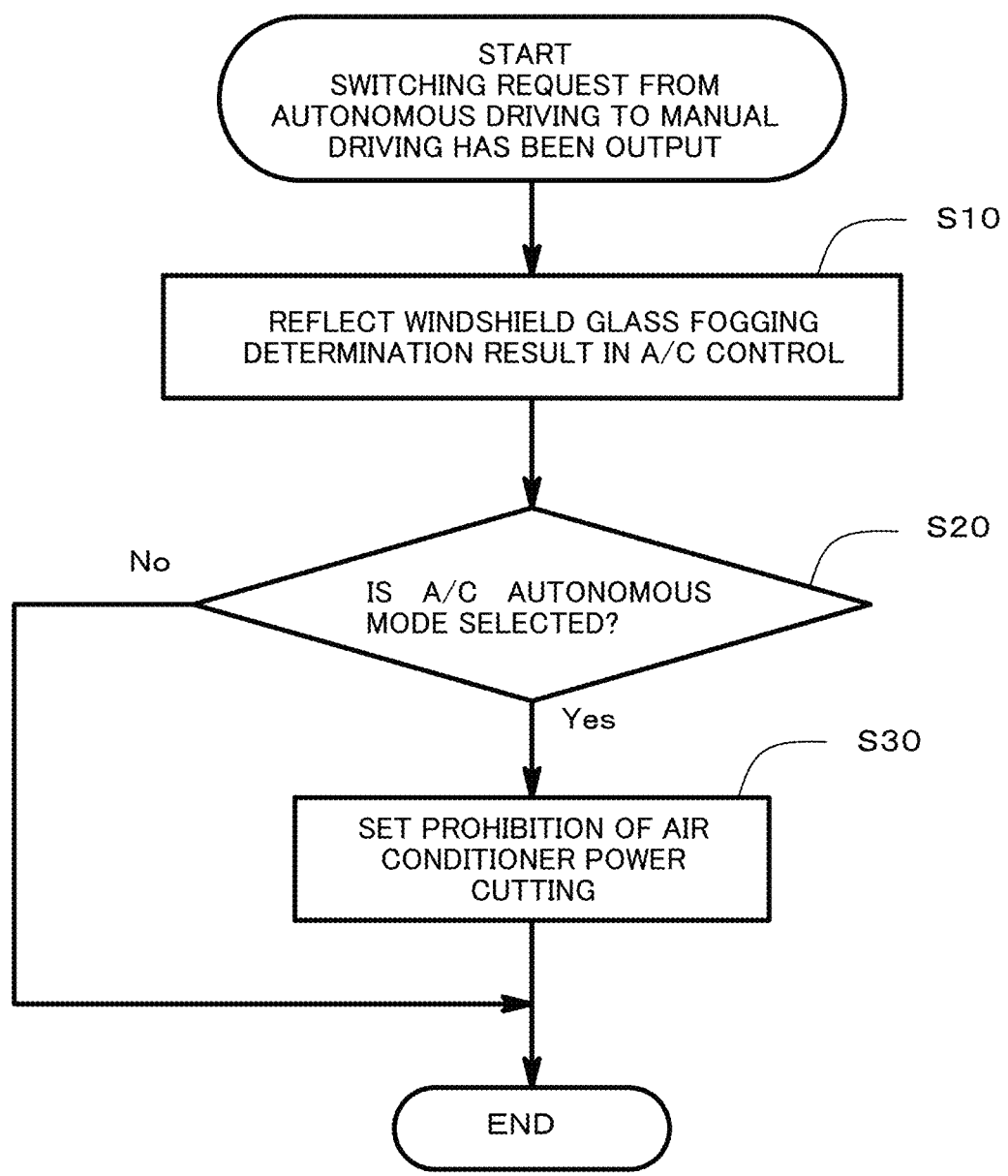
FIG. 12 illustrates a flow of air conditioner power reduction setting.

Based on entry of the vehicle 100 into the driving switching preparing section to transfer to manual driving after travelling the autonomous driving section, the air conditioner ECU 43 performs the air conditioner power cutting setting flow illustrated in FIG. 12. The air conditioner ECU 43 receives, from the autonomous travelling controller 41C (see FIG. 3) of the autonomous driving ECU 41, a switching request from autonomous driving to manual driving, via the CGW-ECU 40.

In response to the switching request, the fogging determining unit 43B of the air conditioner ECU 43 resumes fogging determination that has been stopped during execution of the autonomous driving control and the air conditioner autonomous control, and reflects the determination result in the control of the air conditioner 25 (S10).

Further, the device controller 43A determines whether or not autonomous control is selected for control setting of the air conditioner 25 (S20). In response to the autonomous control not being selected, which means that the air conditioner power cutting control would not be executed, the air conditioner power cutting setting flow ends.

In response to the autonomous control being selected in step S20, the device controller 43A sets prohibition of performance of the air conditioner power cutting control (S30). This prohibition setting is transmitted to the CGW-ECU 40.

Setting prohibition of the air conditioner power cutting control allows the required power calculator 40A of the CGW-ECU 40 to cut down the required driving power from the required total power in response to the request to reduce the required total power by the power comparator 42A of the battery ECU 42.

This reduces the driving force of the vehicle 100 relative to the required driving force. However, the prohibition of the air conditioner power cutting control secures defogging of the windshield glass 110 at the time of switching from autonomous driving to manual driving.

Particularly, the windshield glass 110 is more likely to fog (that is, is less likely to defog) while the vehicle 100 is travelling in the autonomous driving section than while travelling in the manual driving section. Securing the windshield glass 110 defogging function in the driving switching preparing section would reliably eliminate the fog that has occurred during travelling in the autonomous driving section.

Once the operation control of the vehicle 100 is switched to manual driving after the driving switching preparing section, the prohibition setting for the air conditioner power cutting control may be cancelled. In other words, the air conditioner power cutting control is executable under the autonomous control of the air conditioner 25.

Figure 13:
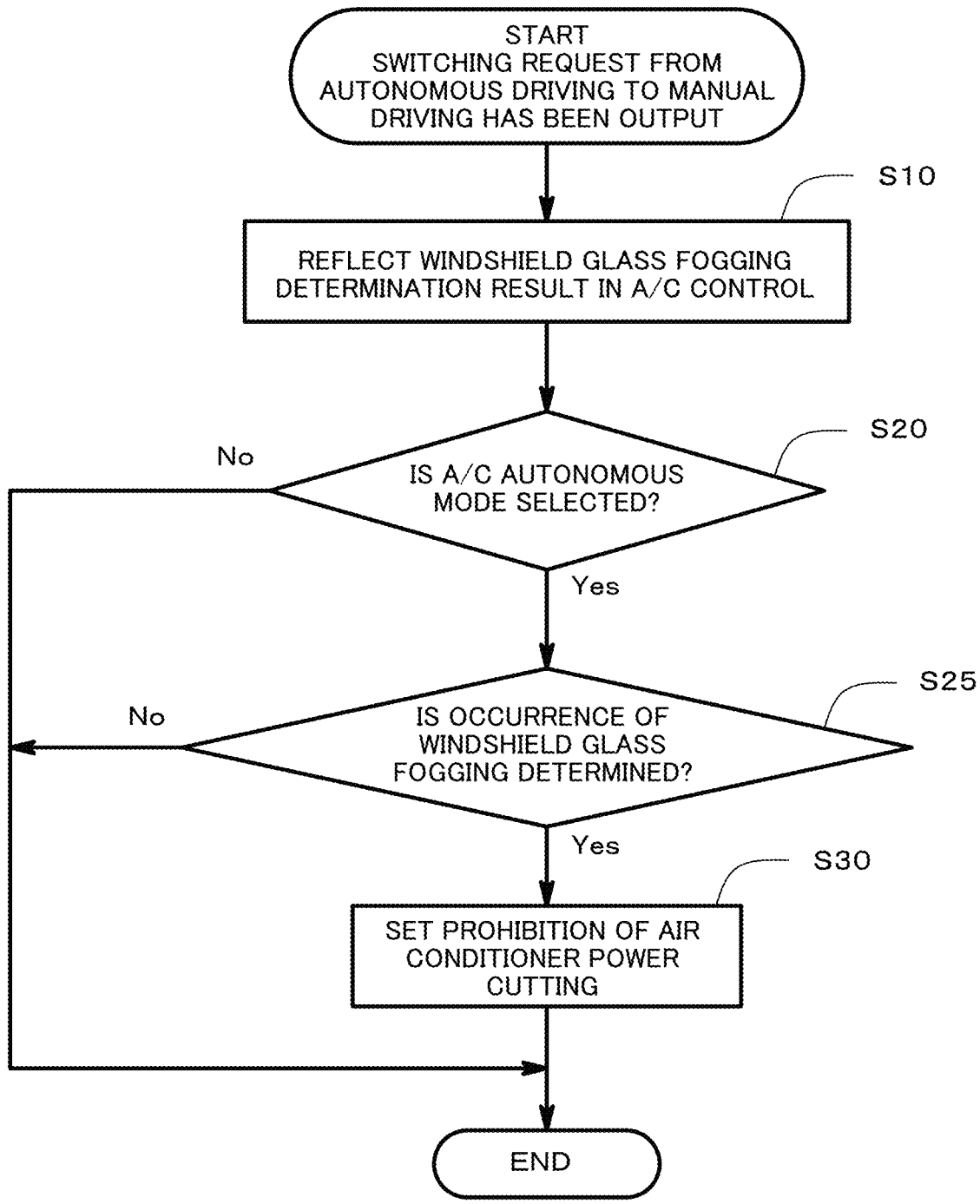
FIG. 13 illustrates a flow of air conditioner power reduction setting according to a first further example.

First Further Example Air Conditioner Control in Driving Switching Preparing Section FIG. 13 shows a first further example air conditioner power cutting setting flow. In the steps shown in FIG. 13 denoted with the same reference numerals as those in FIG. 12, the same processes are performed, and description thereof will be omitted as appropriate.

Referring to FIG. 13, a step S25 is added between step S20 and step S30, for determining whether or not the fogging determining unit 43B determines occurrence of fogging on the windshield glass 110. In response to the fogging determining unit 43B determining occurrence of fogging, the device controller 43A sets prohibition of air conditioner power cutting (S30). In response to the fogging determining unit 43B determining no fogging, with prohibition of air conditioner power cutting not being set, that is, with the air conditioner power cutting being set to be effective, the air conditioner power cutting setting flow ends.

This flow sets the air conditioner power cutting to be effective based on the clear condition that the windshield glass 110 is not foggy; that is, the defogging operation is not to be performed. This enables the required power calculator 40A to cut down the required air conditioning power of the required total power in response to a request to reduce the required total power from the required power calculator 40A of the CGW-ECU 40 to the power comparator 42A of the battery ECU 42, thereby securing the vehicle driving force.

Figure 14:
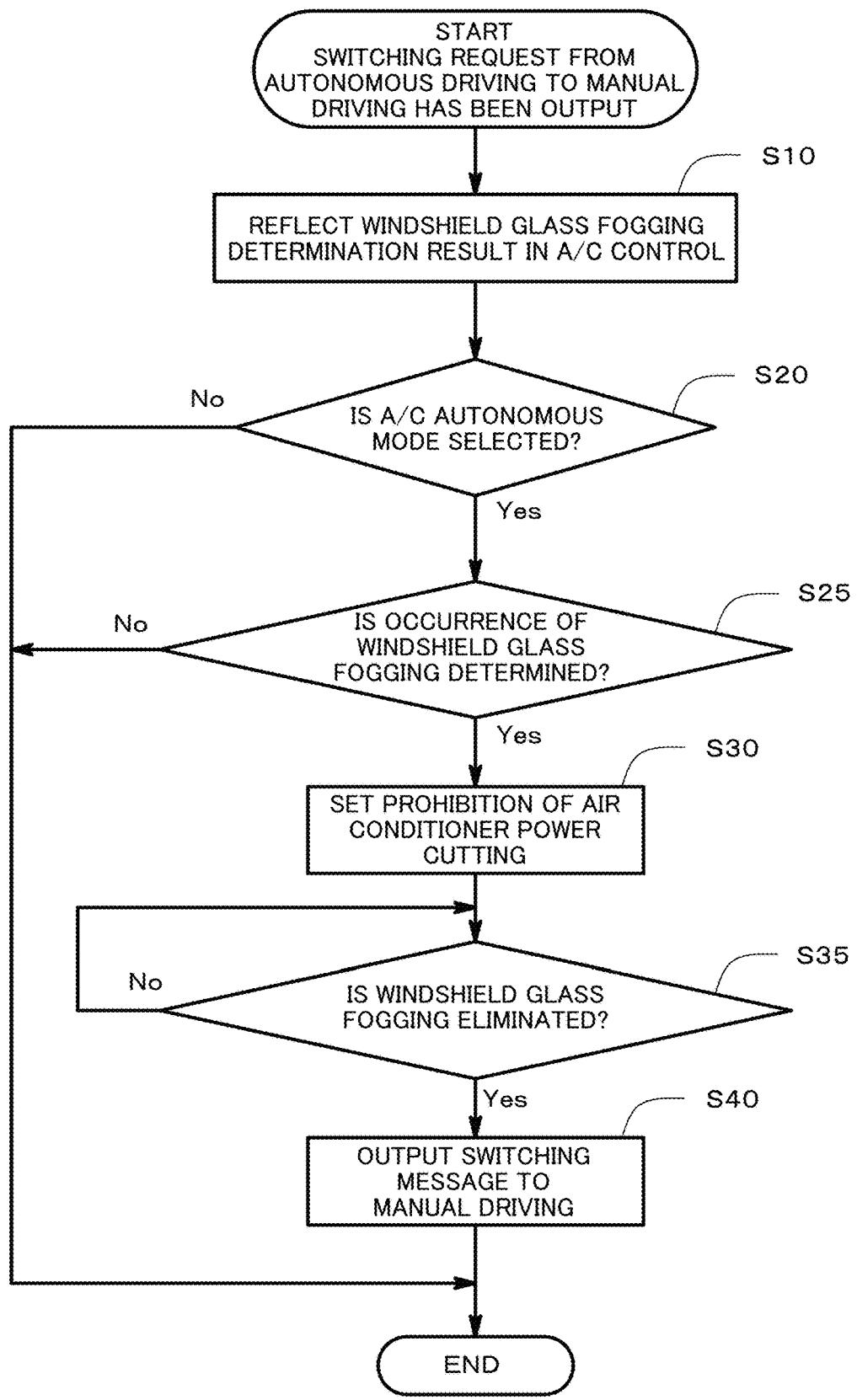
FIG. 14 illustrates a flow of air conditioner power reduction setting according to a second further example.

Second Further Example Air Conditioner Control in Driving Switching Preparing Section FIG. 14 shows a second further example air conditioner power cutting setting flow. In the steps shown in FIG. 14 denoted with the same reference numerals as those in FIG. 13, the same processes are performed, and description thereof will be omitted below as appropriate.

Referring to FIG. 14, after performing of the air conditioner power cutting control is prohibited in step S30, the fogging determining unit 43B performs the fogging determination described above and then determines whether fogging on the windshield glass 110 has been eliminated (S35). In response to determining that fogging is not eliminated, the fogging determining unit 43B returns to the process in step S35.

In response to determining that fogging on the windshield glass 110 has been eliminated in step S35, the fogging determining unit 43B transmits, via the CGW-ECU 40, a signal indicative of elimination of fogging to the autonomous driving ECU 41. The autonomous travelling controller 41C (see FIG. 3) of the autonomous driving ECU 41 then displays, on the meter panel, for example, within the vehicle cabin, a message informing switch from autonomous driving control to manual driving control (S40).

This flow allows the autonomous driving ECU 41 to continue the autonomous driving control until the fogging determining unit 43B determines elimination of fogging of the windshield glass 110. In other words, control is transferred from autonomous driving to manual driving with fogging on the windshield glass 110 being eliminated. Transfer of control to manual driving after the driver's good field of view has been established enhances the driver's sense of security.

Vehicle including Internal Combustion Engine as Drive Source

While in the above embodiments, the vehicle 100 includes only the rotary electric machine 11 as a drive source, the air conditioner control according to the present embodiments is also applicable in the vehicle 100 including an internal combustion engine, as a drive source, in place of or in addition to the rotary electric machine 11.

In this configuration, the compressor 33 is driven by the internal combustion engine. As such, the compressor 33 and the driving wheels 16 contend for the torque of the internal combustion engine. To secure the vehicle driving force, the air conditioner power cutting control is performed as appropriate.

In this configuration, for convenience, the required power calculator 40A of the CGW-ECU 40 is referred to as a required torque calculator. The required torque calculator receives, from the autonomous driving ECU 41, a value of the required driving torque (required vehicle driving force) for the internal combustion engine. The required torque calculator further receives, from the air conditioner ECU 43, a value of the torque for the compressor 33 or the required air conditioning torque. The required torque calculator further obtains a value of the required total torque including the required driving torque and the required air conditioning torque, and transmits the obtained value to the engine ECU that is not shown.

The engine ECU determines whether the received value of the required total torque exceeds the value of the maximum output torque of a known internal combustion engine. In response to determining that the required total torque exceeds the maximum output torque, the engine ECU requests the CGW-ECU 40 for reduction of the required total torque.

In response, the CGW-ECU 40 reduces the required air conditioning torque of the required total torque, and instructs the air conditioner ECU 43 to execute the air conditioner power cutting control. For example, the CGW-ECU40 cuts down the torque required for driving the compressor 33 of the required total torque.

Further, when the vehicle 100 is travelling in the driving switching preparing section described above, the air conditioner ECU 43 and the autonomous driving ECU 41 perform the air conditioner power cutting setting flow illustrated in FIG. 12 to FIG. 14, and determine whether or not the air conditioner power cutting control is prohibited as described above.

The present disclosure is not limited to the present embodiments described above, and includes all changes and modifications without departing from the technical scope or the essence of the present disclosure defined by the claims.

The invention claimed is:

1. A vehicle air conditioner control system comprising:
   an air conditioner including a compressor configured to contend with a driving wheel for torque of an internal combustion engine or to contend with a rotary electric machine that is a vehicle drive source for battery power;
   an air conditioner controller configured to switch operation control of the air conditioner between manual control and autonomous control; and
   an autonomous driving controller configured to perform autonomous driving control of a vehicle, wherein
   the air conditioner controller is configured to perform air conditioner power cutting control to regulate driving of the compressor in accordance with required vehicle driving force, during execution of the autonomous control, and
   the air conditioner controller is configured to prohibit performance of the air conditioner power cutting control in a driving switching preparing section of a road wherein autonomous driving performed by the autonomous driving controller is to be switched to manual driving performed by a driver.

2. The vehicle air conditioner control system according to claim 1, wherein
   the air conditioner controller comprises a fogging determining unit configured to determine whether fogging occurs on a windshield glass, and
   in response to determining occurrence of fogging on the windshield glass by the fogging determining unit in the driving switching preparing section, the air conditioner controller is configured to prohibit performance of the air conditioner power cutting control.

3. The vehicle air conditioner control system according to claim 2, wherein
   the autonomous driving controller is configured to continue the autonomous driving control in the driving switching preparing section until the fogging determining unit determines elimination of fogging on the windshield glass.

4. A non-transitory recording medium storing a vehicle air conditioner control program causing a computer to perform the following functions, the computer to be used with an air conditioner including a compressor configured to contend with a driving wheel for torque of an internal combustion engine or to contend with a rotary electric machine that is a vehicle drive source for battery power and to be used with an autonomous driving controller configured to perform autonomous driving control of a vehicle,
   the functions comprising:
   functioning as an air conditioner controller configured to switch operation control of the air conditioner between manual control and autonomous control;
   allowing the air conditioner controller to perform air conditioner power cutting control to regulate driving of the compressor in accordance with required vehicle driving force during execution of the autonomous control; and
   allowing the air conditioner controller to prohibit the air conditioner power cutting control in a driving switching preparing section of a road wherein autonomous driving performed by the autonomous driving controller is switched to manual driving performed by a driver.

5. The non-transitory recording medium according to claim 4, wherein
the air conditioner controller comprises a fogging determination unit configured to determine whether fogging occurs on a windshield glass, and
in response to determining occurrence of fogging on the windshield glass by the fogging determining unit in the driving switching preparing section, the air conditioner controller is configured to prohibit performance of the air conditioner power cutting control.

6. The non-transitory recording medium according to claim 5, wherein
the autonomous driving controller is configured to continue the autonomous driving control in the driving switching preparing section until the fogging determining unit determines elimination of fogging on the windshield glass.

* * * * *